US009600066B2

United States Patent
Yang

(10) Patent No.: US 9,600,066 B2
(45) Date of Patent: Mar. 21, 2017

(54) 3D HUMAN-MACHINE INTERACTION METHOD AND SYSTEM

(71) Applicant: ZTE Corporation, Shenzhen, Guangdong (CN)

(72) Inventor: Xiangling Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 153 days.

(21) Appl. No.: 14/406,987

(22) PCT Filed: Jul. 23, 2013

(86) PCT No.: PCT/CN2013/079937
§ 371 (c)(1),
(2) Date: Dec. 10, 2014

(87) PCT Pub. No.: WO2014/015798
PCT Pub. Date: Jan. 30, 2014

(65) Prior Publication Data
US 2015/0169045 A1    Jun. 18, 2015

(30) Foreign Application Priority Data

Jul. 23, 2012 (CN) .......................... 2012 1 0255981

(51) Int. Cl.
*G06F 3/01* (2006.01)
*G06F 3/0481* (2013.01)

(52) U.S. Cl.
CPC .............. *G06F 3/011* (2013.01); *G06F 3/017* (2013.01); *G06F 3/04815* (2013.01); *G06F 2203/0331* (2013.01)

(58) Field of Classification Search
CPC .... G06F 3/0346; G06F 3/04815; G06F 3/017; G06F 3/041; G06F 3/014; G06F 3/011
See application file for complete search history.

(56) References Cited

U.S. PATENT DOCUMENTS

2007/0055949 A1* 3/2007 Thomas ................. G06F 3/014
715/863
2008/0136775 A1    6/2008 Conant
(Continued)

FOREIGN PATENT DOCUMENTS

CN        101581990 A    11/2009
CN        102226880 A    10/2011
(Continued)

OTHER PUBLICATIONS

Supplementary European Search Report in European application No. 13823376.2, mailed on Oct. 28, 2015.
(Continued)

*Primary Examiner* — Viet Pham
*Assistant Examiner* — Sepehr Azari
(74) *Attorney, Agent, or Firm* — Oppedahl Patent Law Firm LLC

(57) ABSTRACT

Disclosed are a 3D human-machine interaction method and system. An electronic tag with an ID is configured for a hand; a Radio Frequency (RF) electromagnetic field containing a 3D virtual human-machine interface imaging space is configured; after the hand enters the RF electromagnetic field, information on the electronic tag on the hand is acquired; information on locations, moving velocities, moving directions, and moving tracks of each finger and a palm in the 3D virtual human-machine interface imaging space is acquired according to the acquired information on the electronic tag; the information on the locations is matched to a control or hot spot displayed in the 3D virtual human-machine interface imaging space; it is determined whether a movement of a finger and/or the palm matches a movement defined for touch control of the control or hot spot in the 3D virtual human-machine interface imaging space; and operation of the control or hot spot in the 3D virtual human-
(Continued)

machine interface imaging space is triggered. According to the disclosure, naked-eye 3D human-machine interaction with accurate touch control may be implemented.

17 Claims, 3 Drawing Sheets

(56) References Cited

U.S. PATENT DOCUMENTS

| | | | |
|---|---|---|---|
| 2010/0039377 A1 | 2/2010 | Lewis | |
| 2010/0060425 A1* | 3/2010 | Rodriguez | H04Q 9/00 340/10.1 |
| 2010/0210361 A1 | 8/2010 | Crawford | |
| 2010/0302145 A1* | 12/2010 | Langridge | G06F 3/011 345/157 |
| 2011/0221656 A1* | 9/2011 | Haddick | G02B 27/017 345/8 |
| 2012/0094594 A1* | 4/2012 | Rofougaran | G06F 1/1626 455/15 |

FOREIGN PATENT DOCUMENTS

| | | |
|---|---|---|
| CN | 102819315 A | 12/2012 |
| EP | 2221707 A1 | 8/2010 |
| EP | 2390761 A1 | 11/2011 |
| WO | 2008091857 A1 | 7/2008 |

OTHER PUBLICATIONS

International Search Report in international application No. PCT/CN2013/079937, mailed on Oct. 31, 2013.

English Translation of the Written Opinion of the International Search Authority in international application No. PCT/CN2013/079937, mailed on Oct. 31, 2013.

* cited by examiner

3D HUMAN-MACHINE INTERACTION METHOD AND SYSTEM

TECHNICAL FIELD

The disclosure relates to human-machine interaction technology for terminal devices, and in particular to a 3D human-machine interaction method and system.

BACKGROUND

Interaction by a conventional display and input device, such as a touch control screen and a keyboard, is still two-dimensional, and is limited by a specific planar area of a physical device. On one hand, as a physical display and input device, a mobile terminal is preferred to be slim, compact, and portable. On the other hand, it is desirable to have larger effective area for display and touch control; both requirements may be met through virtual display and touch input. A mobile terminal with a conventional two-dimensional display and input device is not comparable to a desktop in terms of amount of information displayed, accuracy of a contact point, and easiness in operation. To have display and input capability comparable to that of a desktop, a mobile terminal can overcome physical device limitation per se by virtual display and touch input.

Existing 3D gesture identification techniques are limited to identifying a wide-span, simple, easily identifiable gesture. 3D gestures applicable to a mobile terminal are very limited. For example, 3D virtual keyboard typewriting, 3D virtual handwriting input, and 3D virtual musical instrument playing are all complicated and involve a touch control movement requiring high precision in identification. No existing gesture identification technique can identify a fine, complicated, rapid and continuous hand movement effectively.

In recent years, with the rapid development of Near Field Communication (NFC) and naked-eye 3D display technology, there has been a pressing need for a solution for large-scale application of high-precision 3D human-machine interaction technology on a terminal.

SUMMARY

In view of this, it is desired that embodiments of the disclosure provide a 3D human-machine interaction method and system, capable of implementing naked-eye 3D human-machine interaction with accurate touch control.

To this end, a technical solution of an embodiment of the disclosure is implemented as follows.

An embodiment of the disclosure provides a 3D human-machine interaction method, including steps of: configuring an electronic tag with an ID for a hand; configuring a Radio Frequency (RF) electromagnetic field containing a 3D virtual human-machine interface imaging space;

after the hand enters the RF electromagnetic field, acquiring information on the electronic tag on the hand;

acquiring information on locations, moving velocities, moving directions, and moving tracks of each finger and a palm in the 3D virtual human-machine interface imaging space according to the acquired information on the electronic tag;

matching the information on the locations to a control or hot spot displayed in the 3D virtual human-machine interface imaging space;

determining whether a movement of a finger and/or the palm matches a movement defined for touch control of the control or hot spot in the 3D virtual human-machine interface imaging space; and when the movement of a finger and/or the palm matches the movement defined for touch control of the control or hot spot, triggering operation of the control or hot spot in the 3D virtual human-machine interface imaging space.

In an embodiment, the step of configuring an electronic tag with an ID for a hand may include steps of:

configuring an electronic tag with an ID respectively for each finger and each palm of a human body, and saving a relation mapping a finger and/or a palm to the ID of an electronic tag in a storage module of a terminal.

In an embodiment, the electronic tag may be a passive Radio Frequency IDentification (RFID) electronic tag or an active RFID electronic tag; and an electronic tag with an ID may be configured for a hand by: configuring an electronic tag on each finger and/or palm directly by adhering, painting, wearing, or implantation; or configuring an electronic tag on each finger and/or palm indirectly.

In an embodiment, the step of configuring an RF electromagnetic field containing a 3D virtual human-machine interface imaging space may include a step of:

regulating a scope of the RF electromagnetic field by adjusting an RF output power or an antenna working frequency of a Radio Frequency IDentification (RFID) read-write module in a terminal, such that the RF electromagnetic field contains the 3D virtual human-machine interface imaging space.

In an embodiment, the method may include steps of:

increasing or reducing the 3D virtual human-machine interface imaging space; and increasing or reducing the RF electromagnetic field with the 3D virtual human-machine interface imaging space.

In an embodiment, the step of acquiring information on the electronic tag on the hand may include steps of:

performing contactless RF signal coupling of a Radio Frequency IDentification (RFID) read-write module in a terminal and the electronic tag through a coupling element; transferring energy and exchanging data between the RFID read-write module and the electronic tag within a coupling channel; and after the data exchange, acquiring, by the terminal, the information on the electronic tag on the hand.

In an embodiment, the step of acquiring, by the terminal, the information on the electronic tag on the hand may include steps of: when the contactless RF signal coupling of the RFID read-write module and the electronic tag is performed inductively, converting a change in a distance between an antenna of the RFID read-write module and an antenna of the electronic tag into a change in an antenna voltage or an antenna current; and acquiring the information on the electronic tag by: modulating, by a processing module of the terminal, the antenna voltage of the electronic tag and demodulating the antenna voltage of the RFID read-write module according to resistive load modulated data information transfer.

In an embodiment, the step of acquiring, by the terminal, the information on the electronic tag on the hand may include a step of: when the contactless RF signal coupling of the RFID read-write module and the electronic tag is performed through electromagnetic backscattering, bringing back, by an RF signal transmitted by an antenna of the RFID read-write module and reflected by the electronic tag, the information on the electronic tag of each finger and/or palm according to radar positioning.

In an embodiment, when the electronic tag is a passive RFID electronic tag, the terminal may acquire the information on the electronic tag on the hand by: after the hand enters the RF electromagnetic field, receiving, by the electronic tag, an RF signal transmitted by an RFID read-write module in the terminal through an antenna, and sending the information on the electronic tag stored in a chip of the electronic tag to the RFID read-write module using a resulting induced current as a working current; and reading and then decoding, by the RFID read-write module, the information on the electronic tag, and sending the decoded information on the electronic tag to a processing module of the terminal for data processing.

In an embodiment, when the electronic tag is an active RFID electronic tag, the terminal may acquire the information on the electronic tag on the hand by:

after the hand enters the RF electromagnetic field, actively sending, by the electronic tag, the information on the electronic tag stored in a local chip to an RFID read-write module through a signal of a frequency; and reading and then decoding, by the RFID read-write module, the information on the electronic tag, and sending the decoded information on the electronic tag to a processing module of the terminal for data processing.

In an embodiment, the step of acquiring information on locations, moving velocities, moving directions, and moving tracks of each finger and a palm in the 3D virtual human-machine interface imaging space may include steps of:

after acquiring the information on the electronic tag of the hand, determining, by the RFID read-write module in the terminal, a specific palm part and/or a specific finger moving in the RF electromagnetic field according to the ID of the electronic tag in the information on the electronic tag, as well as a relation mapping a finger and/or a palm to the ID of an electronic tag saved in a storage module in the terminal;

acquiring, according to a strength of an RF signal between the RFID read-write module and the electronic tag on the hand, the information on the locations of each finger and the palm in the 3D virtual human-machine interface imaging space; calculating the moving velocity, the moving direction, and the moving track of a finger and/or the palm according to information on two locations of the finger and/or palm acquired respectively by two successive acquiring operations.

In an embodiment, the step of acquiring information on locations, moving velocities, moving directions, and moving tracks of each finger and a palm in the 3D virtual human-machine interface imaging space may include steps of:

after acquiring the information on the electronic tag of the hand, determining, by the RFID read-write module in the terminal, a specific palm part and/or a specific finger moving in the RF electromagnetic field according to the ID of the electronic tag in the information on the electronic tag, as well as a relation mapping a finger and/or a palm to the ID of an electronic tag saved in a storage module in the terminal;

acquiring, using radar positioning, information on a distance and an angle of the hand according to a transmission duration and an angle between the transmitted RF signal and an echo signal; acquiring the information on the locations of each finger and the palm in the 3D virtual human-machine interface imaging space according to the information on the distance and the angle of the hand; and calculating the moving velocity, the moving direction, and the moving track of a finger and/or the palm according to information on two locations of the finger and/or palm acquired respectively by two successive acquiring operations.

In an embodiment, the method may further include steps of:

generating, by a processing module, a data file according to the information on the locations, the moving velocities, the moving directions, and the moving tracks, and saving the data file in the RFID read-write module or the storage module of the terminal.

In an embodiment, the step of matching the information on the locations to a control or hot spot displayed in the 3D virtual human-machine interface imaging space may include a step of:

determining, according to the information on the locations of each finger and the palm in the 3D virtual human-machine interface imaging space, whether the locations of each finger and the palm in the 3D virtual human-machine interface imaging space fall within a spatial range of the control or hot spot displayed in the 3D virtual human-machine interface imaging space; and when the location of a finger and/or a palm falls within the spatial range, determining that the control or hot spot is touched by the finger and/or the palm.

In an embodiment, the step of determining whether a movement of a finger and/or the palm matches a movement defined for touch control of the control or hot spot in the 3D virtual human-machine interface imaging space may include a step of:

determining, by a processing module, whether the movement of the finger and/or the palm matches the movement defined for touch control of the control or hot spot in the 3D virtual human-machine interface imaging space according to the locations, the moving velocities, the moving directions, and the moving tracks of the finger and/or the palm.

An embodiment of the disclosure further provides a 3D human-machine interaction system, including:

a first configuration module configured for: configuring an electronic tag with an ID for a hand;

a second configuration module configured for: configuring a Radio Frequency (RF) electromagnetic field containing a 3D virtual human-machine interface imaging space;

a Radio Frequency IDentification (RFID) read-write module configured for: after the hand enters the RF electromagnetic field, acquiring information on the electronic tag on the hand; and a processing module configured for: acquiring information on locations, moving velocities, moving directions, and moving tracks of each finger and a palm in the 3D virtual human-machine interface imaging space according to the acquired information on the electronic tag; matching the information on the locations to a control or hot spot displayed in the 3D virtual human-machine interface imaging space; determining whether a movement of a finger and/or the palm matches a movement defined for touch control of the control or hot spot in the 3D virtual human-machine interface imaging space; and when the movement of a finger and/or the palm matches the movement defined for touch control of the control or hot spot, triggering operation of the control or hot spot in the 3D virtual human-machine interface imaging space.

With the 3D human-machine interaction method and system provided by embodiments of the disclosure, an electronic tag with an ID is configured for a hand; an RF electromagnetic field containing a 3D virtual human-machine interface imaging space is configured; after the hand enters the RF electromagnetic field, information on the electronic tag on the hand is acquired; information on locations, moving velocities, moving directions, and moving tracks of a finger and a palm in the 3D virtual human-machine interface imaging space is acquired according to the acquired information on the electronic tag; the information on the locations is matched to a control or hot spot displayed in the 3D virtual human-machine interface imaging space; it is determined whether a movement of the finger and/or palm matches a movement defined for touch control of the control or hot spot in the 3D virtual human-machine interface imaging space; and when the movement of the finger and/or palm matches the movement defined for touch control of the control or hot spot, operation of the control or hot spot in the 3D virtual human-machine interface imaging space is triggered. In this manner, 3D spatial positioning combined with 3D virtual human-machine interface imaging allows naked-eye 3D human-machine interaction with accurate touch control, such that a 3D virtual keyboard, 3D virtual handwriting input, a 3D virtual musical instrument and the like can be implemented, removing planar restriction to human-machine interaction at a terminal, and implementing most natural human-machine interaction in a free space.

DETAILED DESCRIPTION

Radio Frequency IDentification (RFID) positioning may be implemented using NFC technology in promotion. The NFC technology mainly involves an NFC read-write device (including a chip and an antenna), an RFID electronic tag (including a chip and an antenna) and related software. The NFC read-write device and the RFID electronic tag communicate with each other wirelessly through the antennas. The RFID electronic tag consists of a coupling element (i.e. the antenna) and the chip. Each RFID electronic tag has a unique electronic code (ID). An RFID electronic tag is attached to an object for identifying a target. RFID refers to contactless automatic identification. After entering an RF electromagnetic field, an RFID electronic tag acquires an induced current as a working power to send information on the tag to the NFC read-write device, The identification does not need manual intervention. In addition, with the RFID technology, a fast-moving object may be identified, and a plurality of RFID electronic tags may be identified simultaneously.

According to embodiments of the disclosure, an electronic tag with an ID is configured for a hand; an RF electromagnetic field containing a 3D virtual human-machine interface imaging space is configured; after the hand enters the RF electromagnetic field, information on the electronic tag on the hand is acquired; information on locations, moving velocities, moving directions, and moving tracks of each finger and a palm in the 3D virtual human-machine interface imaging space is acquired according to the acquired information on the electronic tag; the information on the locations is matched to a control or hot spot displayed in the 3D virtual human-machine interface imaging space; it is determined whether the movement of the finger and/or the palm matches the movement defined for touch control of the control or hot spot in the 3D virtual human-machine interface imaging space; when the movement of a finger and/or a palm matches the movement defined for touch control of the control or hot spot, operation of the control or hot spot in the 3D virtual human-machine interface imaging space is triggered.

The disclosure will be further elaborated below with reference to drawings and specific embodiments.

Figure 1:
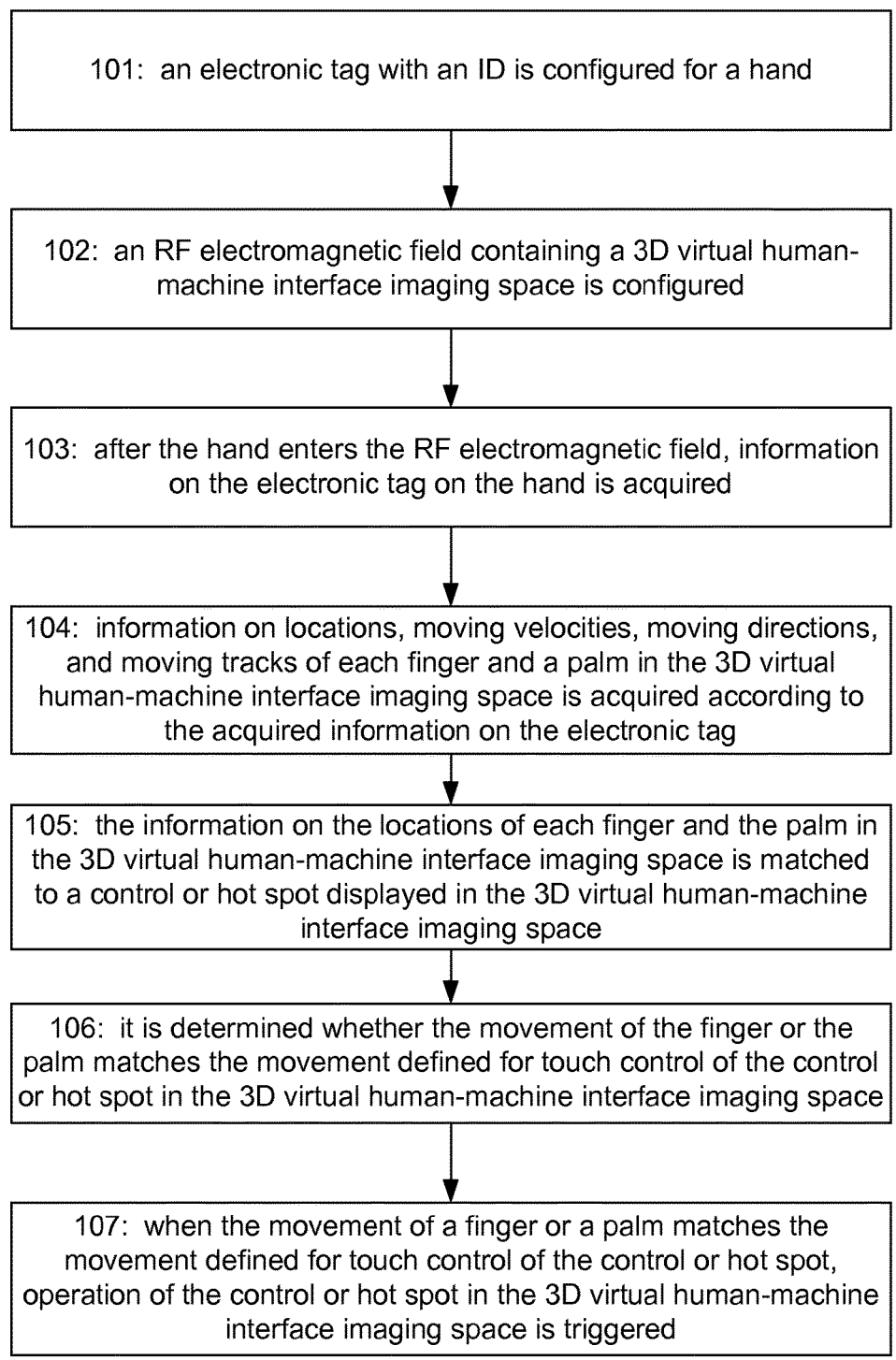
FIG. 1 is a flowchart of a 3D human-machine interaction method according to an embodiment of the disclosure.

An embodiment of the disclosure provides a 3D human-machine interaction method. FIG. 1 is a flowchart of a 3D human-machine interaction method according to an embodiment of the disclosure. As shown in FIG. 1, the method includes steps as follows.

In Step 101, an electronic tag with an ID is configured for a hand.

Specifically, an electronic tag with an ID is configured respectively for each finger and each palm of a human body, and a relation mapping a finger and/or a palm to the ID of an electronic tag is saved in a storage module of a terminal. The electronic tag may be an RFID electronic tag. The electronic tag may be a passive Radio Frequency IDentification (RFID) electronic tag or an active RFID electronic tag. For example, a Surface Acoustic Wave (SAW) passive electronic tags or the like may be used. An electronic tag with an ID may be configured for a hand by: configuring an electronic tag on each finger and/or palm directly by adhering, painting, wearing, or implantation; or configuring an electronic tag on each finger and/or palm indirectly by configuring the electronic tag on an article such as a glove or a fingernail sheath.

In Step 102, an RF electromagnetic field containing a 3D virtual human-machine interface imaging space is configured.

Figure 2:
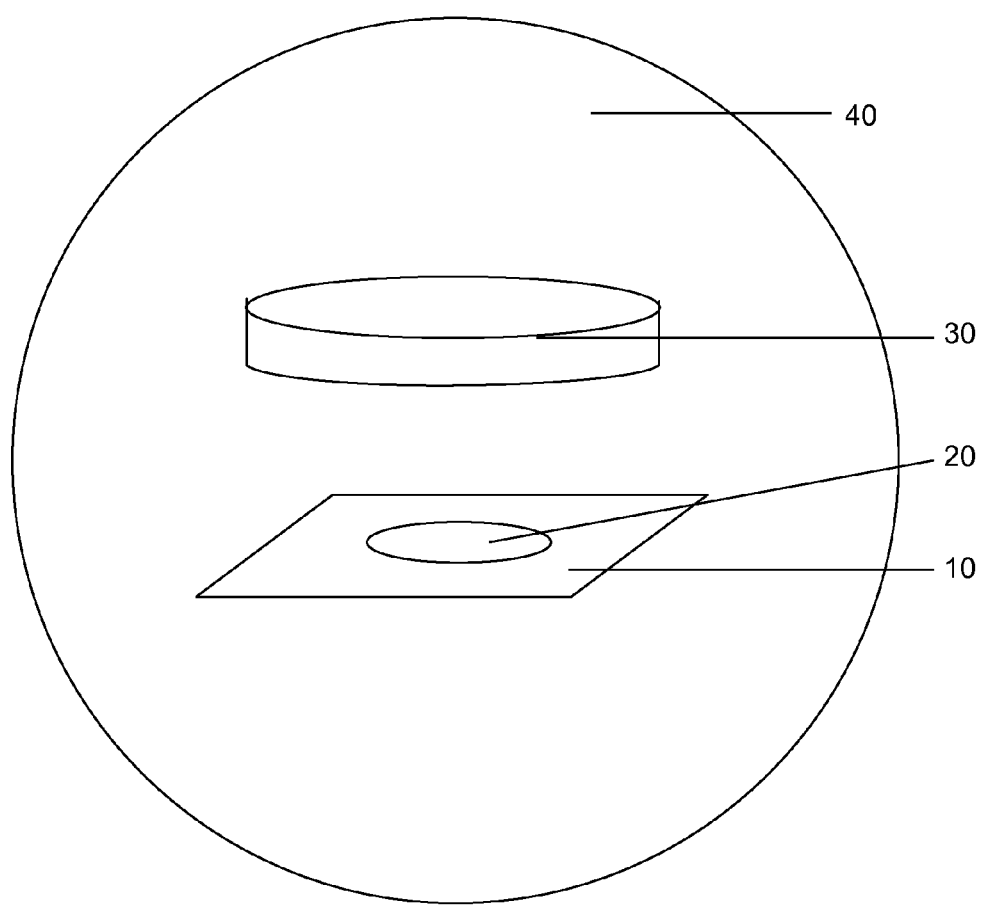
FIG. 2 is a schematic diagram of locations of an RF electromagnetic field and a 3D virtual image according to an embodiment of the disclosure.

Specifically, as shown in FIG. 2, a 2D image 20 displayed in a terminal 10 forms a 3D virtual human-machine interface imaging space 30 in space. A scope of the RF electromagnetic field 40 is regulated by adjusting an RF output power of an NFC chip or an antenna working frequency of an RFID read-write module in the terminal, such that the RF electromagnetic field 40 can contain the 3D virtual human-machine interface imaging space 30.

In an embodiment of the disclosure, the 3D virtual human-machine interface imaging space 30 coincides with the scope of the RF electromagnetic field 40, and uses the same coordinate system as the RF electromagnetic field. The 3D virtual human-machine interface imaging space 30 may be enlarged or reduced. In addition, the scope of the RF electromagnetic field 40 may be increased or reduced with the 3D virtual human-machine interface imaging space 30. Each pixel point in the 3D virtual human-machine interface imaging space 30 corresponds to a unique set of three-dimensional coordinates in the RF electromagnetic field 40. In an embodiment of the disclosure, the terminal may support 3D image display. In an embodiment, the terminal may support naked-eye 3D image display. The terminal may be a handheld terminal, such as a mobile phone supporting naked-eye 3D image display. Or the terminal may be a fixed terminal, such as a display or a television set supporting naked-eye 3D image display.

In Step 103, after the hand enters the RF electromagnetic field, information on the electronic tag on the hand is acquired.

Specifically, the information on the electronic tag may include the ID of the electronic tag corresponding to a finger and/or palm, as well as coordinates of the finger and/or the palm in the 3D virtual human-machine interface imaging space.

Contactless RF signal coupling of an RFID read-write module in the terminal and the electronic tag may be performed through a coupling element, and energy transfer and data exchange between the RFID read-write module and the electronic tag may be implemented within a coupling channel. The RF signal coupling of the RFID read-write module and the electronic tag may be performed inductively, namely through a spatial high-frequency alternating magnetic field, such that a change in a distance between an antenna of the RFID read-write module and an antenna of the electronic tag is converted into a change in an antenna voltage or an antenna current. The ID of the electronic tag of a finger and/or palm is binary coded. A processing module of the terminal may modulate the antenna voltage of the electronic tag and demodulate the antenna voltage of the RFID read-write module according to resistive load modulated data information transfer, so as to acquire the information on the electronic tag. When the RFID read-write module is close to the electronic tag, with a distance of about tens of centimeters to 1 meter, for example, an NFC chip may be adopted as the RFID read-write module. The information on the electronic tag may generally be acquired by inductive coupling. Alternatively, the RF signal coupling of the RFID read-write module and the electronic tag may also be performed through electromagnetic backscattering. According to radar positioning, the RF signal transmitted by the antenna of the RFID read-write module is reflected by the electronic tag, bringing back the information on the electronic tag of each finger and/or palm. The processing module may calculate the change in the distance of a finger and/or palm and record the change in the angle of the echo signal according to a time difference between the transmitted RF signal and an echo signal reflected by the electronic tag, such that a location, a moving direction and a moving velocity of a finger and/or palm in the 3D virtual human-machine interface imaging space may be determined. When the RFID read-write module is far from the electronic tag, with a distance of several meters to tens of meters, the information on the electronic tag may generally be acquired by electromagnetic backscattering coupling.

When a passive RFID electronic tag is configured for a hand, after the hand enters the RF electromagnetic field, the electronic tag may receive an RF signal transmitted by an RFID read-write module in the terminal through an antenna, and send the information on the electronic tag stored in a local chip to the RFID read-write module using a resulting induced current as a working current; the RFID read-write module may read and then decode the information on the electronic tag, and send the decoded information on the electronic tag to the processing module of the terminal for data processing.

An active electronic tag has an internal power supply for powering internal drive of the active electronic tag to generate an external signal. When an active RFID electronic tag is configured for a hand, after the hand enters the RF electromagnetic field, the electronic tag may actively send the information on the electronic tag stored in a local chip to an RFID read-write module through a signal of a frequency; the RFID read-write module may read and then decode the information on the electronic tag, and send the decoded information on the electronic tag to the processing module of the terminal for data processing.

In Step 104, information on locations, moving velocities, moving directions, and moving tracks of each finger and a palm in the 3D virtual human-machine interface imaging space is acquired according to the acquired information on the electronic tag.

Specifically, after acquiring the information on the electronic tag of the hand, the RFID read-write module in the terminal may determine a specific palm part and/or a specific finger moving in the RF electromagnetic field according to the ID of the electronic tag in the information on the electronic tag, as well as a relation mapping a finger and/or palm to the ID of an electronic tag saved in the storage module in the terminal. As a plurality of (e.g. 10 or more) electronic tags may work at the same frequency, when the plurality of electronic tags are in the scope of the same RF electromagnetic field, a multiple access control mechanism is required to avoid a failure in reading information on an electronic tag due to a conflict during information transmission. When a multiple access control mechanism is adopted, an anti-conflict algorithm by Time Division Multiple Access (TDMA), Frequency Division Multiple Access (FDMA), or Code Division Multiple Access (CDMA).

Then, when the RF signal coupling of the RFID read-write module and the electronic tag is performed inductively, as an object is uniquely identified by an electronic tag, the information on the locations of a finger and a palm in the 3D virtual human-machine interface imaging space may be acquired according to a strength of an RF signal between the RFID read-write module and the electronic tag on the hand; the moving velocity, the moving direction, and the moving track of a finger and/or palm may be calculated according to information on two locations of the finger and/or palm acquired respectively by two successive acquiring operations.

Alternatively, when the RF signal coupling of the RFID read-write module and the electronic tag is performed through electromagnetic backscattering, using radar positioning, information on a distance and an angle of the hand may be acquired according to a transmission duration and an angle between the transmitted RF signal and an echo signal; the information on the locations of a finger and a palm in the 3D virtual human-machine interface imaging space may be acquired according to the information on the distance and the angle of the hand; and the moving velocity, the moving direction, and the moving track of a finger and/or palm may be calculated according to information on two locations of the finger and/or palm acquired respectively by two successive acquiring operations. The distance of the hand, i.e., the distance between the electronic tag and the RFID read-write module, may be acquired by measuring the time difference between the RF signal of the RFID read-write module and the echo signal of the electronic tag and multiplying half of the time difference by the speed of light. An angle to be measured here refers to an angle of the electronic tag with respect to the antenna of the RFID read-write module, and mainly includes a polar angle and an azimuth angle. The RF signal beam transmitted by the RFID read-write module is similar to the beam of a searchlight, which is narrow hand highly directional. A large space may be covered by the detection by constantly changing the direction of the antenna of the RFID read-write module. When the RF signal beam shines in a direction, if there is an echo signal fed back by an electronic tag, the RFID read-write module may record information on the angle; otherwise if there is no echo signal, detection continues in another direction. Alternatively, a smart beam scanning antenna array may be applied on the RFID read-write module, which may turns on and off different antennas according to a certain sequence to sense electronic tags in different antenna coverage areas, increasing system coverage. Meanwhile, coordinates of a electronic tag on a finger and/or palm are recorded.

According to information on locations of the finger and/or palm corresponding to the ID of the same electronic tag successively acquired by the RFID read-write module in a set time interval, the processing module of the terminal may calculate the moving velocity, the moving direction, and the moving track of the finger and/or palm. Then, the processing module may generate a data file according to the information on the locations, the moving velocities, the moving directions, and the moving tracks; and saves the data file in the RFID read-write module. For example, when an NFC chip built in the terminal serves as an RFID read-write device, the data file may be saved in the NFC chip. Alternatively, the data file may also be saved in the storage module of the terminal.

In Step 105, the information on the locations of each finger and the palm in the 3D virtual human-machine interface imaging space is matched to a control or hot spot displayed in the 3D virtual human-machine interface imaging space.

Specifically, it may be determined whether the locations of a finger and a palm in the 3D virtual human-machine interface imaging space fall within a spatial range of the control or hot spot displayed in the 3D virtual human-machine interface imaging space according to the information on the locations of the finger and the palm in the 3D virtual human-machine interface imaging space. When the location of a finger and/or palm falls within the spatial range, it is determined that the control or hot spot is touched by the finger and/or palm, and step 106 is then performed; otherwise if no location of a finger and/or palm falls within the spatial range, it is determined that the control or hot spot is not touched by the finger and/or palm, and the flow ends.

Note that when a hand wears a glove configured with an electronic tag, or when the electronic tag is configured by painting, the contour of the hand, and the location and shape of the hand with respect to a control, such as a holding gesture, can also be calculated accurately. It may be determined whether the locations of a finger and a palm in the 3D virtual human-machine interface imaging space fall within a spatial range of a control or hot spot displayed in the 3D virtual human-machine interface imaging space according to the location and shape of the hand with respect to the control.

In Step 106, it is determined whether the movement of the finger and/or the palm matches the movement defined for touch control of the control or hot spot in the 3D virtual human-machine interface imaging space.

Specifically, in general, if the spatial location occupied by the contour of a finger and/or palm overlaps with the spatial range of the control or hot spot, it means that the control or hot spot has been touched by the finger and/or palm, and the processing module determines whether the movement of the finger and/or palm matches the movement defined for touch control of the control or hot spot in the 3D virtual human-machine interface imaging space according to the location, the moving velocity, the moving direction, and the moving track of the finger and/or palm. If the movement of the finger and/or palm matches the movement defined, then the movement of the finger and/or palm is considered effective, and step 107 is performed to trigger operation of the control or hot spot in the 3D virtual human-machine interface imaging space. If the movement of the finger and/or palm matches no movement defined, then the movement of the finger and/or palm is considered ineffective and is ignored, and the flow ends. It may be determined whether the movement of a finger and/or palm matches the movement defined for touch control of the control or hot spot in the 3D virtual human-machine interface imaging space by determining whether the location, the moving velocity, the moving direction, and the moving track of the finger and/or palm match the movement defined for touch control of the control or hot spot in the 3D virtual human-machine interface imaging space. For example, a movement defined for touch control of a control or hot spot may be pressing, dialling, pushing and pulling, lifting, putting down, enlarging, reducing, grasping, rotating, etc.

In Step 107, when the movement of a finger and/or a palm matches the movement defined for touch control of the control or hot spot, operation of the control or hot spot in the 3D virtual human-machine interface imaging space is triggered.

Specifically, movements of a finger and/or palm are distinguished according to the location, the moving velocity, the moving direction, and the moving track of the finger and/or palm. For example, the moving velocity of a finger and/or palm may reflect the strength of a movement, and a degree and a mode of operation and the like may be determined according to the strength. For example, in playing a 3D virtual piano, if the location of a finger coincides with the spatial range of a virtual key, it means that the finger has touched the key. A downward movement of the finger presses the key, and a sound has to be made. The faster the finger moves, the harder the key is pressed, and the louder the sound will be.

Figure 3:
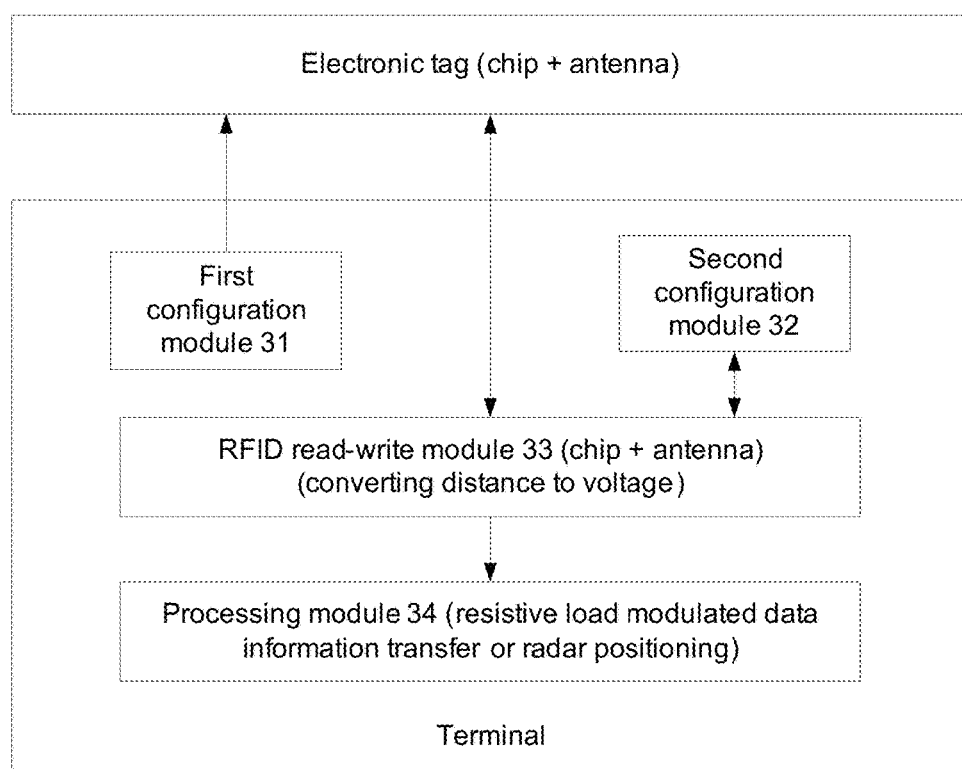
FIG. 3 is a flow diagram of a 3D human-machine interaction system according to an embodiment of the disclosure.

To implement an aforementioned method, an embodiment of the disclosure further provides a 3D human-machine interaction system. FIG. 3 is a schematic diagram of a structure of a 3D human-machine interaction system according to an embodiment of the disclosure. As shown in FIG. 3, the system includes:

a first configuration module 31 configured for: configuring an electronic tag with an ID for a hand;

a second configuration module 32 configured for: configuring an RF electromagnetic field containing a 3D virtual human-machine interface imaging space;

an RFID read-write module 33 configured for: after the hand enters the RF electromagnetic field, acquiring information on the electronic tag on the hand;

a processing module 34 configured for: acquiring information on locations, moving velocities, moving directions, and moving tracks of each finger and a palm in the 3D virtual human-machine interface imaging space according to the acquired information on the electronic tag; matching the information on the locations to a control or hot spot displayed in the 3D virtual human-machine interface imaging space; determining whether a movement of a finger and/or the palm matches a movement defined for touch control of the control or hot spot in the 3D virtual human-machine interface imaging space; and when the movement of a finger and/or the palm matches the movement defined for touch control of the control or hot spot, triggering operation of the control or hot spot in the 3D virtual human-machine interface imaging space.

What described are merely embodiments of the disclosure, and are not intended to limit the scope of the present disclosure. Any modification, equivalent replacement, improvement, and the like made within the spirit and principle of the present disclosure should be included in the scope of the present disclosure.

The invention claimed is:
1. A 3D human-machine interaction method, comprising steps of: configuring an electronic tag with an ID for a hand;

configuring a Radio Frequency (RF) electromagnetic field containing a 3D virtual human-machine interface imaging space;
  after the hand enters the RF electromagnetic field, acquiring information on the electronic tag on the hand;
  acquiring coordinates, moving velocities, moving directions, and moving tracks of a finger and/or a palm part in the 3D virtual human-machine interface imaging space according to the acquired information on the electronic tag;
  matching the coordinates to a control or hot spot displayed in the 3D virtual human-machine interface imaging space;
  determining whether a movement of the finger and/or the palm part matches a movement defined for touch control of the control or hot spot in the 3D virtual human-machine interface imaging space; and when the movement of the finger and/or the palm part matches the movement defined for touch control of the control or hot spot, triggering operation of the control or hot spot in the 3D virtual human-machine interface imaging space,
  wherein the step of acquiring information on the electronic tag on the hand comprises steps of:
  performing contactless RF signal coupling of a Radio Frequency Identification (RFID) read-write module in a terminal and the electronic tag through a coupling element; transferring energy and exchanging data between the RFID read-write module and the electronic tag within a coupling channel; and after the data exchange, acquiring, by the terminal, the information on the electronic tag on the hand,
  wherein the step of acquiring, by the terminal, the information on the electronic tag on the hand comprises steps of: when the contactless RF signal coupling of the RFID read-write module and the electronic tag is performed inductively,
  converting a change in a distance between an antenna of the RFID read-write module and an antenna of the electronic tag into a change in an antenna voltage or an antenna current; and acquiring the information on the electronic tag by: modulating, by a processing module of the terminal, the antenna voltage of the electronic tag and demodulating the antenna voltage of the RFID read-write module according to resistive load modulated data information transfer.

2. The method according to claim 1, wherein the step of configuring an electronic tag with an ID for a hand comprises steps of:
  configuring an electronic tag with an ID respectively for a finger and/or a palm part of a human body, and saving a relation mapping a finger and/or a palm part to the ID of an electronic tag in a storage module of a terminal.

3. The method according to claim 2, wherein
  the electronic tag is a passive Radio Frequency Identification (RFID) electronic tag or an active RFID electronic tag; and
  an electronic tag with an ID is configured for a hand by: configuring an electronic tag on a finger and/or a palm part directly by adhering, painting, wearing, or implantation; or configuring an electronic tag on a finger and/or a palm part indirectly.

4. The method according to claim 3, wherein when the electronic tag is a passive RFID electronic tag, the terminal acquires the information on the electronic tag on the hand by: after the hand enters the RF electromagnetic field, receiving, by the electronic tag, an RF signal transmitted by an RFID read-write module in the terminal through an antenna, and sending the information on the electronic tag stored in a chip of the electronic tag to the RFID read-write module using a resulting induced current as a working current; and reading and then decoding, by the RFID read-write module, the information on the electronic tag, and sending the decoded information on the electronic tag to a processing module of the terminal for data processing.

5. The method according to claim 3, wherein when the electronic tag is an active RFID electronic tag, the terminal acquires the information on the electronic tag on the hand by:
  after the hand enters the RF electromagnetic field, actively sending, by the electronic tag, the information on the electronic tag stored in a local chip to an RFID read-write module through a signal of a frequency; and reading and then decoding, by the RFID read-write module, the information on the electronic tag, and sending the decoded information on the electronic tag to a processing module of the terminal for data processing.

6. The method according to claim 3, comprising steps of:
  increasing or reducing the 3D virtual human-machine interface imaging space; and
  increasing or reducing the RF electromagnetic field with the 3D virtual human-machine interface imaging space.

7. The method according to claim 2, comprising steps of:
  increasing or reducing the 3D virtual human-machine interface imaging space; and
  increasing or reducing the RF electromagnetic field with the 3D virtual human-machine interface imaging space.

8. The method according to claim 1, wherein the step of configuring an RF electromagnetic field containing a 3D virtual human-machine interface imaging space comprises a step of:
  regulating a scope of the RF electromagnetic field by adjusting an RF output power or an antenna working frequency of a Radio Frequency Identification (RFID) read-write module in a terminal, such that the RF electromagnetic field contains the 3D virtual human-machine interface imaging space.

9. The method according to claim 8, comprising steps of:
  increasing or reducing the 3D virtual human-machine interface imaging space; and
  increasing or reducing the RF electromagnetic field with the 3D virtual human-machine interface imaging space.

10. The method according to claim 1, comprising steps of:
  increasing or reducing the 3D virtual human-machine interface imaging space; and
  increasing or reducing the RF electromagnetic field with the 3D virtual human-machine interface imaging space.

11. The method according to claim 1, wherein the step of acquiring coordinates, moving velocities, moving directions, and moving tracks of a finger and/or a palm part in the 3D virtual human-machine interface imaging space comprises steps of:
  after acquiring the information on the electronic tag of the hand, determining, by the RFID read-write module in the terminal, a specific palm part and/or a specific finger moving in the RF electromagnetic field according to the ID of the electronic tag in the information on the electronic tag, as well as a relation mapping a finger and/or a palm part to the ID of an electronic tag saved in a storage module in the terminal;
  acquiring, according to a strength of an RF signal between the RFID read-write module and the electronic tag on the hand, the coordinates of the finger and/or the palm part in the 3D virtual human-machine interface imaging space; calculating the moving velocity, the moving direction, and the moving track of the finger and/or the palm part according to a series of successive coordinate of the finger and/or the palm part acquired respectively by a series of successive acquiring operations.

12. The method according to claim 11, further comprising steps of:
generating, by a processing module, a data file according to the coordinates, the moving velocities, the moving directions, and the moving tracks, and saving the data file in the RFID read-write module or the storage module of the terminal.

13. The method according to claim 1, wherein the step of matching the coordinates to a control or hot spot displayed in the 3D virtual human-machine interface imaging space comprises a step of:
determining, according to the coordinates of the finger and/or the palm part in the 3D virtual human-machine interface imaging space, whether the coordinates of the finger and/or the palm part in the 3D virtual human-machine interface imaging space fall within a spatial range of the control or hot spot displayed in the 3D virtual human-machine interface imaging space; and when the coordinates of the finger and/or the palm part fall within the spatial range, determining that the control or hot spot is touched by the finger and/or the palm part.

14. The method according to claim 1, wherein the step of determining whether a movement of the finger and/or the palm part matches a movement defined for touch control of the control or hot spot in the 3D virtual human-machine interface imaging space comprises a step of:
determining, by a processing module, whether the movement of the finger and/or the palm part matches the movement defined for touch control of the control or hot spot in the 3D virtual human-machine interface imaging space according to the coordinates, the moving velocities, the moving directions, and the moving tracks of the finger and/or the palm part.

15. A 3D human-machine interaction method, comprising steps of: configuring an electronic tag with an ID for a hand; configuring a Radio Frequency (RF) electromagnetic field containing a 3D virtual human-machine interface imaging space;
after the hand enters the RF electromagnetic field, acquiring information on the electronic tag on the hand;
acquiring coordinates, moving velocities, moving directions, and moving tracks of a finger and/or a palm part in the 3D virtual human-machine interface imaging space according to the acquired information on the electronic tag;
matching the coordinates to a control or hot spot displayed in the 3D virtual human-machine interface imaging space;
determining whether a movement of the finger and/or the palm part matches a movement defined for touch control of the control or hot spot in the 3D virtual human-machine interface imaging space; and when the movement of the finger and/or the palm part matches the movement defined for touch control of the control or hot spot, triggering operation of the control or hot spot in the 3D virtual human-machine interface imaging space,
wherein the step of acquiring information on the electronic tag on the hand comprises steps of:
performing contactless RF signal coupling of a Radio Frequency Identification (RFID) read-write module in a terminal and the electronic tag through a coupling element; transferring energy and exchanging data between the RFID read-write module and the electronic tag within a coupling channel; and after the data exchange, acquiring, by the terminal, the information on the electronic tag on the hand,
wherein the step of acquiring the information on the electronic tag on the hand comprises a step of: when the contactless RF signal coupling of the RFID read-write module and the electronic tag is performed through electromagnetic backscattering, bringing back, by an RF signal transmitted by an antenna of the RFID read-write module and reflected by the electronic tag, the information on the electronic tag of a finger and/or a palm part according to radar positioning,
wherein the step of acquiring coordinates, moving velocities, moving directions, and moving tracks of a finger and/or a palm part in the 3D virtual human-machine interface imaging space comprises steps of:
after acquiring the information on the electronic tag of the hand, determining, by the RFID read-write module in the terminal, a specific palm part and/or a specific finger moving in the RF electromagnetic field according to the ID of the electronic tag in the information on the electronic tag, as well as a relation mapping a finger and/or a palm part to the ID of an electronic tag saved in a storage module in the terminal;
acquiring, using radar positioning, information on a distance and an angle of a finger and/or a palm part according to a transmission duration and an angle between the transmitted RF signal and an echo signal of the transmitted RF signal; acquiring the coordinates of the finger and/or the palm part in the 3D virtual human-machine interface imaging space according to the information on the distance and the angle of a finger and/or a palm part; and calculating the moving velocity, the moving direction, and the moving track of the finger and/or the palm part according to a series of successive coordinate of the finger and/or the palm part acquired respectively by a series of successive acquiring operations.

16. The method according to claim 15, further comprising steps of:
generating, by a processing module, a data file according to the coordinates, the moving velocities, the moving directions, and the moving tracks, and saving the data file in the RFID read-write module or the storage module of the terminal.

17. A 3D human-machine interaction system, comprising:
a first configuration module configured for: configuring an electronic tag with an ID for a hand;
a second configuration module configured for: configuring a Radio Frequency (RF) electromagnetic field containing a 3D virtual human-machine interface imaging space;
a Radio Frequency Identification (RFID) read-write module configured for: after the hand enters the RF electromagnetic field, acquiring information on the electronic tag on the hand; and
a processing module configured for: acquiring coordinates, moving velocities, moving directions, and moving tracks of a finger and/or a palm part in the 3D virtual human-machine interface imaging space according to the acquired information on the electronic tag; matching the coordinates to a control or hot spot displayed in the 3D virtual human-machine interface imaging space; determining whether a movement of the finger and/or the palm part matches a movement defined for touch control of the control or hot spot in the 3D virtual human-machine interface imaging space; and when the movement of the finger and/or the palm part matches the movement defined for touch control of the control or hot spot, triggering operation of the control or hot spot in the 3D virtual human-machine interface imaging space, wherein the RFID read-write module is configured for:

performing contactless RF signal coupling of the RFID read-write module and the electronic tag through a coupling element; transferring energy and exchanging data between the RFID read-write module and the electronic tag within a coupling channel; and after the data exchange, acquiring the information on the electronic tag on the hand, wherein the RFID read-write module is configured for: when the contactless RF signal coupling of the RFID read-write module and the electronic tag is performed inductively, converting a change in a distance between an antenna of the RFID read-write module and an antenna of the electronic tag into a change in an antenna voltage or an antenna current, wherein the processing module is configured for: modulating the antenna voltage of the electronic tag and demodulating the antenna voltage of the RFID read-write module according to resistive load modulated data information transfer.

* * * * *